Patented May 15, 1951

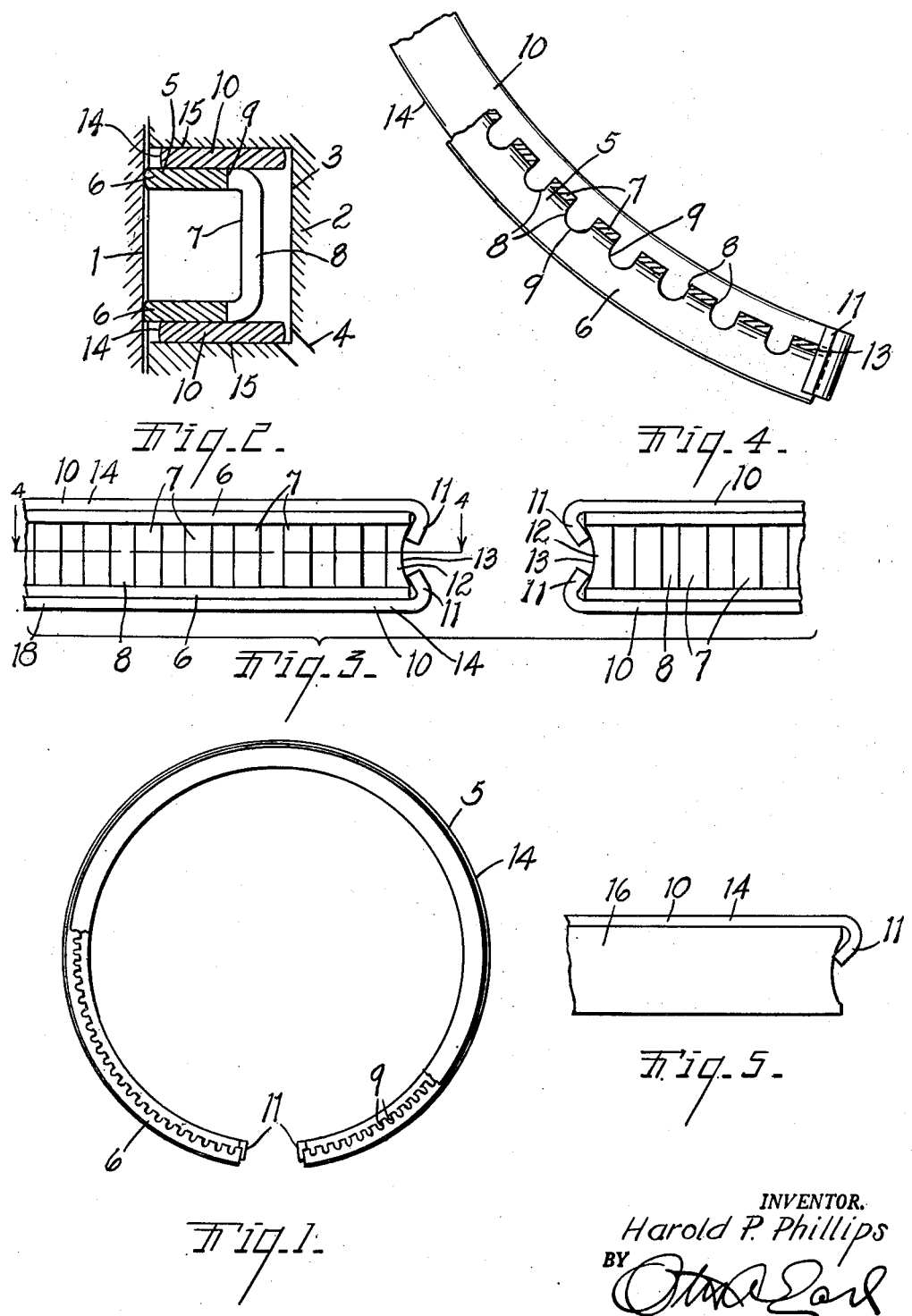

2,553,002

UNITED STATES PATENT OFFICE 2,553,002

PISTON RING ASSEMBLY

Harold P. Phillips, Hastings, Mich., assignor to Hastings Manufacturing Company, Hastings, Mich.

Application November 15, 1948, Serial No. 60,057

10 Claims. (Cl. 309—43)

This invention relates to improvements in piston ring assemblies.

The main objects of this invention are:

First, to provide a piston ring assembly, the parts of which may be formed of ductile metal and including a ring member having axially spaced cylinder wall engaging elements and a cooperating expander disposed at the side of the ring member.

Second, to provide a piston ring assembly including an expander member which is effective in applying expanding stress to the ring member without the expander member being supported on the bottom of the ring groove.

Third, to provide a piston ring assembly embodying my invention which may be readily installed without likelihood of breakage or injury thereto.

Fourth, to provide an expander element for split ring members which is so positioned that it is subject to little wear in use and remains efficient for a long period of time.

Objects relating to details and economies of the invention will appear from the description to follow. The invention is pointed out in the claims.

A preferred embodiment of the invention is illustrated in the accompanying drawing, in which:

Fig. 1 is a side elevational view of a piston ring assembly embodying my invention with portions broken away to illustrate the structure.

Fig. 2 is an enlarged fragmentary view in longitudinal section through a cylinder wall and piston showing the ring assembly of my invention installed in a piston ring groove and in association with a cylinder wall.

Fig. 3 is an enlarged peripheral view at the joint or split thereof illustrating the assembly in relaxed or uncompressed position.

Fig. 4 is a fragmentary view in section on a line corresponding to line 4—4 of Fig. 3.

Fig. 5 is an enlarged fragmentary view of a modified form of my invention in which only one expander element is employed and that in association with another form of ring member.

In the accompanying drawing 1 represents a cylinder, 2 a piston, and 3 a ring groove thereof provided with drainage holes 4. I have not attempted, in the accompanying drawing, to show the parts in relative dimensions or the clearances or tolerances customarily provided in piston ring installations such as those of internal combustion engines. The necessity for such clearances and tolerances is recognized by those skilled in the art.

The piston ring member, designated generally by the numeral 5, is formed of ductile metal. It should be understood, however, that my invention in its broader aspects includes assemblies in which the piston ring member is of cast iron or other suitable material, as shown in Fig. 5. The ring member 5, which is of general outwardly facing channel section, has two cylinder wall engaging elements designated by the numerals 6—6.

These cylinder wall engaging elements are connected at their inner edges by peripherally spaced cross pieces 7 resulting from providing angularly spaced slots 8 in the web portion of the ring member. These slots desirably extend into the ring members, as shown at 9, providing additional drainage and also permitting conforming of the ring members to the cylinder wall where it may be slightly out-of-round or the like.

In the embodiment shown in Figs. 1, 2, and 3, I provide a pair of expander members 10 desirably formed of ribbon steel coiled edgewise. These expander members 10 are split and have inturned ends 11 which engage the ends of the ring member when the expander members are disposed in the sides thereof. The end cross pieces 12 of the ring member have notches 13 therein receiving the inturned ends or lugs 11 as shown in Fig. 3.

The peripheries 14 of the expander members are spaced from the cylinder wall engaging peripheries of the ring member so that the expander members do not come into contact with the cylinder wall. When assembled in a piston ring groove, the expander members are in supported relation to the sides 15 of the ring groove but are not in supported engagement with the bottom of the groove.

In Figs. 1 to 4, I have illustrated a pair of expander members but in many installations a single expander member is sufficient, as illustrated in Fig. 5. The ring member 16, there illustrated, is of the cast iron type.

The expander members and the ring element expand and contract substantially as a unit so that there is little wear between them. When the assembly is installed in a piston ring groove in association with the cylinder wall, the expander member or members is placed under compression stress with its ends in thrust engagement with the ends of the ring member so that the ring member is urged yieldingly outward against the cylinder wall.

Where a channel shaped ring member is used, the expander member might be disposed between the members 6 thereof but that would generally necessitate a narrower expander or the increase in the radial depth of the ring member. However, such an arrangement might be desirable in narrow piston ring grooves. The expanders are desirably formed of ribbon steel coiled edgewise and tension may be very greatly varied by varying relative relaxed dimensions of the ring member and the expander member. One of the advantages of this type of expander is that it is not supported on the bottom of the groove and therefore may be utilized in grooves of widely varying depths.

Whether a pair of expanders are used or a single expander, the expander or expanders may be assembled with the ring member and installed in a piston ring groove as a unit which is a further advantage.

I have illustrated and described my invention in a highly practical embodiment thereof. I have not attempted to illustrate or describe various modifications and adaptations which I contemplate as it is believed that this disclosure will enable those skilled in the art to embody or adapt my invention as may be desired.

Having thus described my invention, what I claim as new and desire to secure by Letters Patent is:

1. A piston ring assembly comprising an annular, split, expansible ring member of ductile metal having axially spaced cylinder wall engaging elements connected at their inner edges by integral cross pieces angularly spaced to provide drain openings between the cylinder wall engaging elements, and thin flat resilient expander members formed of ductile ribbon metal coiled edgewise and disposed radially edgewise at the outer sides of the ring member cylinder wall engaging elements and having axially disposed inturned ends in thrust engagement with the ends of the ring member, the end cross pieces of the ring member being recessed to receive the inturned ends of the expander members, the peripheries of the expander members lying within the peripheries of the ring elements when the assembly is disposed in a piston ring groove with the ring elements in operative association with a cylinder wall, in which position the expander members apply yielding expanding stress to the ring member.

2. A piston ring assembly comprising an annular, split, expansible ring member of outwardly facing channel section, the flanges thereof constituting axially spaced cylinder wall engaging elements, the web thereof having angularly spaced drain openings therethrough, and an annular flat, split resilient expander element disposed at one side of the ring member and having axially disposed inturned ends in thrust retaining engagement with the ends of the ring member and acting to springably expand the same.

3. A piston ring assembly comprising an annular, split, expansible ring member, and a flat resilient expander member formed of ductile ribbon metal coiled edgewise and disposed radially edgewise at the side of the ring member and having axially disposed inturned ends in thrust engagement with the ends of the ring member in the split thereof, the direction of the force of the thrust on the ends of the ring member being longitudinally of the portions of the ring member on the opposite sides of the split to separate said ends, the periphery of the expander member lying within the periphery of the ring member when the assembly is disposed in a piston ring groove with the ring member in operative association with a cylinder wall in which position the expander member applies yielding expanding stress to the ring member.

4. A piston ring assembly comprising an annular, split, expansible ring member of outwardly facing channel section, at least one of the flanges thereof constituting a cylinder wall engaging element, the web thereof having angularly spaced drain openings therethrough, and a split resilient expander element disposed at one side of the ring member with its ends axially turned and in thrust retaining engagement with the ends of the ring member and acting to springably expand the same.

5. A piston ring assembly comprising an annular, split, expansible ring member of ductile metal and having axially spaced connected cylinder wall engaging elements, there being drain openings between the elements, and flat split resilient expander elements disposed radially edgewise at the side of the ring member and having axially disposed inturned ends in thrust engagement with the ends of the ring member and acting to subject the ring member to yieldable radial expanding stresses.

6. A piston ring assembly comprising a split, expansible ring member, and an annular, split resilient expander element disposed at one side of the ring element and having its ends axially turned and in thrust connection with the ends of the ring member in the split thereof, the direction of the force of the thrust on the ends of the ring member being longitudinally of the portions of the ring member on the opposite sides of the split to separate said ends, the periphery of the expander element lying within the periphery of the ring member when the assembly is under compression in a piston ring groove.

7. A piston ring assembly comprising an annular, split, expansible ring member of ductile metal and having a flange-like cylinder wall engaging element, and a flat, split resilient expander element disposed radially edgewise at the side of the ring member and having its ends axially turned and in thrust engagement with the ends of the ring member in the split thereof and acting to subject the ring member to yieldable radial expanding stresses, the direction of the force of the thrust on the ends of the ring member being longitudinally of the portions of the ring member on the opposite sides of the split thereof to separate said ends.

8. A piston ring assembly comprising an annular, split, expansible ring member having axially spaced cylinder wall engaging elements connected by peripherally spaced cross members, and a split resilient expander element having its ends in thrust connection with the ends of the ring member, the direction of the force of the thrust on the ends of the ring member being longitudinally of the portions of the ring member on the opposite sides of the split thereof to separate said ends.

9. An annular, split, piston ring expander formed of ribbon steel coiled edgewise, and having axially disposed lugs at the ends thereof for thrust engagement with the ends of a split ring member with which it is associated in side by side relation, the direction of the force of the thrust on the ends of the ring member being longitudinally of the portions of the ring member on the opposite sides of the split thereof to separate said ends.

10. An annular, split, resilient piston ring expander formed of ribbon steel coiled edgewise and having axially disposed lugs at the ends thereof adapted for thrust engagement with the ends of a split ring member with which it is associated, the direction of the force of the thrust on the ends of the ring member being longitudinally of the portions of the ring member on the opposite sides of the split thereof to separate said ends.

HAROLD P. PHILLIPS.

REFERENCES CITED

The following references are of record in the file of this patent:

UNITED STATES PATENTS

| Number | Name | Date |
|---|---|---|
| 1,987,840 | Newson | Jan. 15, 1935 |
| 2,294,177 | Halford | Aug. 25, 1942 |
| 2,459,157 | Frisby | Jan. 18, 1949 |

FOREIGN PATENTS

| Number | Country | Date |
|---|---|---|
| 404,102 | Great Britain | of 1934 |